Dec. 5, 1933.  G. T. VOORHEES  1,938,234
AIRCRAFT
Filed Oct. 8, 1927
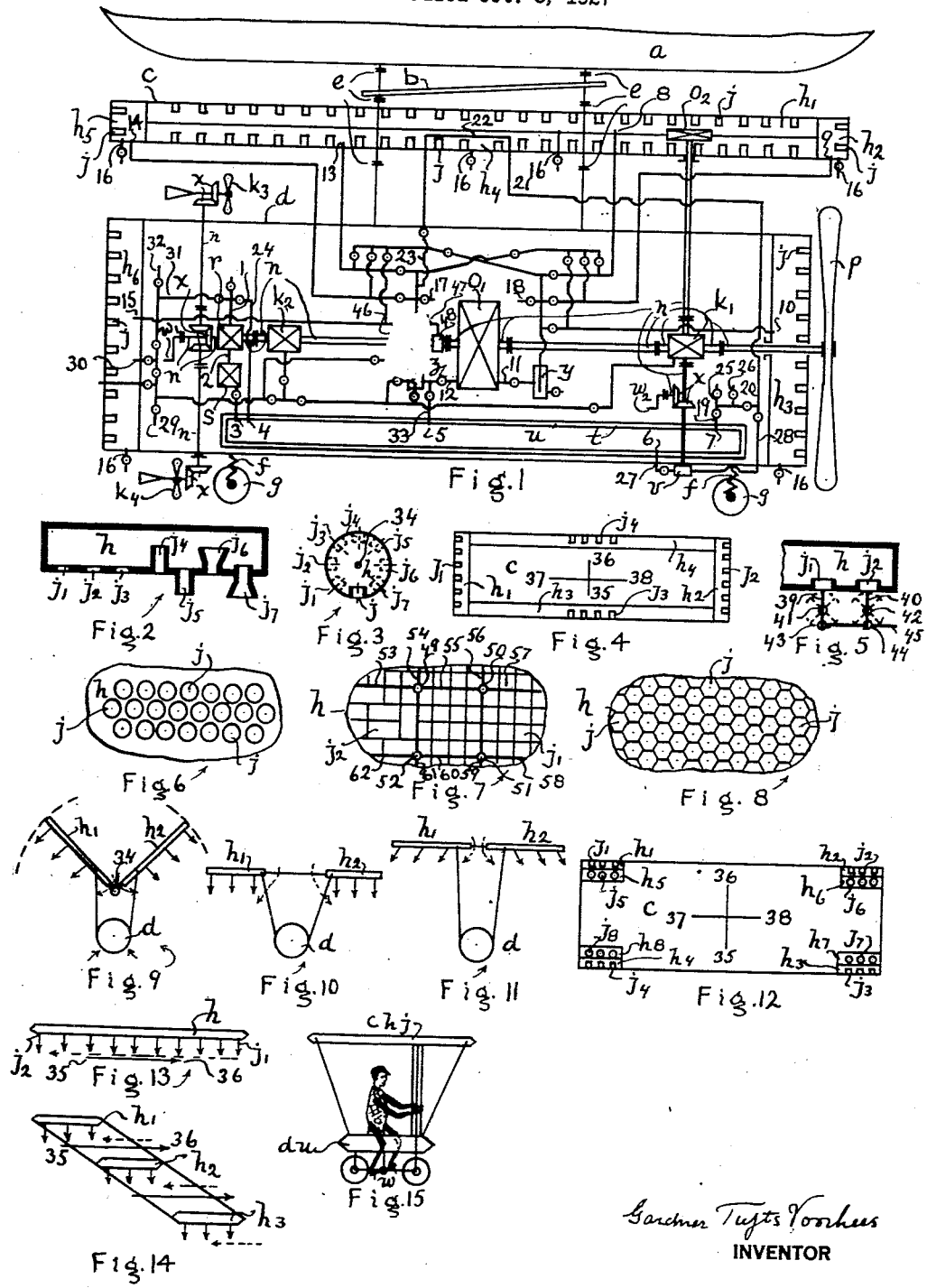
Gardner Tufts Voorhees
INVENTOR Patented Dec. 5, 1933

1,938,234

UNITED STATES PATENT OFFICE 1,938,234

AIRCRAFT

Gardner Tufts Voorhees, Boston, Mass.

Application October 8, 1927. Serial No. 224,974

17 Claims. (Cl. 244—18)

My improved aircraft has for its object the overcoming of many of the present defects in such aircraft, either lighter than or heavier than air, by the action of one or more orifices or nozzles, acting either as a supporting, propelling or steering means or all and by certain adaptations and modifications of said orifices or nozzles and of their use and application.

In the drawing, all of which is diagrammatic and schematic:—

Fig. 1 is a part sectional side elevation of an aircraft.

Fig. 2 is a cross section of a flying chamber.

Fig. 3 is a cross section of a flying chamber which may be oscillated.

Fig. 4 is a sectional plan of a structure having side flying chambers.

Fig. 5 is a cross section of a flying chamber provided with deflecting means.

Fig. 6 is a sectional plan view of a group of circular orifices or nozzles in a flying chamber.

Fig. 7 is a sectional plan view of a group of square or rectangular orifices or nozzles in a flying chamber.

Fig. 8 is a sectional plan view of a group of hexagonal orifices or nozzles in a flying chamber.

Fig. 9 is an end elevation of a flying chamber with a carriage.

Fig. 10 is another end elevation of a flying chamber with a carriage.

Fig. 11 is another end elevation of a flying chamber with a carriage.

Fig. 12 is a sectional plan view of a structure having several flying chambers.

Fig. 13 is a longitudinal elevation of a flying chamber.

Fig. 14 is a longitudinal elevation of a group of flying chambers.

Fig. 15 is a longitudinal elevation of an aircraft with a person.

The great bulk, cost and danger of a gas bag aircraft make it undesirable and difficult to manage in wind. The considerable unobstructed take off and landing space required to get up and reduce an airplane's necessary starting and stopping velocities and its liability to tail spins, nose dives and side slips make it undesirable and dangerous. The danger from unguarded propeller blades is a disadvantage of either a gas bag or an airplane aircraft. Such propellers are uneconomical in the power they require for the result obtained because of the limitations under which they must operate.

These and other disadvantages of said types of aircraft are overcome or lessened by my new type of aircraft.

In any type of aircraft some supporting force must be used to overcome gravity and some propelling force must be used to overcome the resistance of the atmosphere and its wind currents. The gas bag type overcomes gravity by the lifting effect of a lighter than air gas in its gas bag while an airplane overcomes gravity by having sufficient speed of its airplane, so inclined to its direction of motion as to cause more pressure on the atmosphere below it than on that above it.

My new aircraft may involve only its new principles or may combine them with those of a gas bag or airplane type or both.

My new aircraft may rise from or land in a space but little greater in extent than that which it occupies when at rest and may slowly or rapidly rise from or descend to such a space, either with or without any material velocity in any desired horizontal direction and it has not dangerous propellers. It may carry reserve power means different from those of its normal fuel or may, through the exercise of man power through a long period, generate and store power for use through a short period when its normal fuel has become exhausted and it has many other new and novel features. It also utilizes its power in such a manner as to be more economical than power now required by either the gas bag or airplane type of aircraft.

I use one or more openings in a chamber, which I have sometimes called a flying chamber, for the flow of a fluid therethrough to exert a force on the surrounding atmosphere to cause said chamber to move in said atmosphere. Usually I prefer to have a plurality of said openings in one or more chambers, so placed and located and controlled, as to economically and safely cause fluid jets flowing through said openings to exert force on the surrounding atmosphere in any desired direction or directions, to cause said chamber or chambers to ascend from or descend to the earth's surface or to vary its or their position at fixed or variable speeds, horizontally or vertically or both relative to a fixed point on the earth's surface. Such fluid jets are usually air jets caused by portions of the atmosphere being drawn into an air blower or compressor, via a flying chamber, and then forced into a flying chamber and therefrom to the surrounding atmosphere. But said fluid jets may be of any other desired fluid, such for example, as $CO_2$ or any other gaseous fluid or even a liquid or vapor fluid may be used if so desired. And any fluid may not first have been drained into a blower from the surrounding atmosphere.

My blower or compressor, hereinafter usually called blower, may be of the most economical type and may have as many stages of compression as is desired and may operate steadily or pulsatingly and may operate at very high speeds and thus have very little weight and occupy very little space. Such a blower has no exposed dangerous parts.

Some familiar examples of the action of fluid jets on the surrounding atmosphere in moving their chambers therethrough are the revolving water jets of a lawn sprinkler or the gaseous fire works jets from a nearly vertically mounting sky rocket or from a revolving pin wheel. My jets cause more pressure on the atmosphere between a chamber and the earth, than the attraction of gravitation and other forces, when rising from the earth and causes more pressure on the atmosphere, behind a chamber than an atmosphere in front of a chamber when moving in still air parallel to the earth's surface. The force of said jets or their number and location and their contour and the various methods of producing said jets and the nature of the fluid used therefor all tend to cause such a chamber or chambers to carry themselves and a carriage usually below and depending therefrom, up to any desired altitude in the atmosphere and then down to any desired point on the earth's surface or via the atmosphere in all or in part from any desired point on the earth's surface to any other desired point thereon. Said chambers may be so duplicated and subdivided and controlled as will permit the cutting out of any one or more thereof in case of accident to prevent the sinking of the chambers in the atmosphere as airtight bulkheads prevent the sinking of a ship in water. Either large or small openings or a large or small number thereof may be used. The greater the weight to be lifted and the greater its speed of lift, the greater will be the total area of the jets required to lift it with a given fluid jet speed and jet guide design.

The greater the mass of surrounding atmosphere economically acted upon, the greater will be the stability and economy of my new type of aircraft. Questions of cost, speed, economy and other requirements will determine the number and disposition of said jets and their flying chambers. The relative areas required or used in a heavier than air aircraft to maintain it in the atmosphere are well illustrated in the airplane type. For here we have two important areas, first the area of the circle made by the tips of the propeller blades in their revolutions about the propeller's shaft and second the real or projected area of the supporting planes. Here the area of the propeller circle is small as compared with the real or projected area of the supporting planes. But all the supporting and propelling force utilized is first made on the small propeller circle area, approximately at right angles to the desired supporting force and uneconomically because of the high speed of air handled by the propeller and the small area of outside air contacted with and the obstruction by the front of the airplane carriage to the air displaced on it by the propeller, also because of the nonenclosure of the propeller in a casing and because the propeller handles the air in only one stage of compression.

My invention provides means for materially improving on the inefficient action just mentioned because of its more economically and more directly handling of and pushing or pulling on the surrounding atmosphere so as to tend to cause air handled to be more gradually raised to a desired pressure and to more gradually reconvert velocity of air flow into a more desired pressure on the surrounding atmosphere or on better masses thereof or both. In general I have called a fluid compressing means, a blower, when it operates between low differences in pressure, and a compressor when it operates between high differences in pressure.

In Fig. 1 the lighter than air gas bag $a$, the airplane $b$ and the structure $c$ are connected to carriage $d$ by detachable couplings $e$. Carriage $d$ is provided with shock absorbers $f$ and wheels $g$, adapted to roll on the ground. Carriage $d$ is also adapted to float on water. Structure $c$ and carriage $d$ are provided with flying chambers $h_1$, $h_2$, $h_3$ and $h_4$, $h_5$, $h_6$, provided with orifices or nozzles $j$, adapted for the flow of a fluid therethrough, to or from the surrounding atmosphere. $k_1$ and $k_2$ are motors of any desired type, adapted to transmit power through any desired means as by shaft $n$. $o_1$ and $o_2$ are air blowers of any desired type, having any desired number of compression stages adapted to be actuated by any desired power, as by shafts $n$. $p$ is a propeller adapted to be actuated by any desired power as by shaft $n$. $r$ is a gas compressor of any desired type, having any desired number of compression stages, actuated by any desired power, as by shaft $n$ and adapted to take in any desired gas or vapor thru inlet 1 and to discharge it thru outlet 2. $s$ is a fluid liquefying means of any desired type, adapted to liquefy any gas or vapor discharged from compressor $r$. $u$ is a fluid container, which may be insulated by insulation $t$, and adapted to contain any desired fluid either as a liquid, vapor or gas or all. Container $u$ has inlet 3 and outlets 4, 5, 6, 7. $v$ is a liquid pump of any desired type, adapted to be actuated by any desired power, as by shaft $n$. $u_1$, $u_2$ are means, as cranks, to convert energy from a living being into power that may be transmitted to shafts $n$ in any desired manner as by gears $x$. $k_3$ is a wind motor and $k_4$ is a water motor, adapted to transmit power in any desired manner as via gears $x$ and shafts $n$. The short lines across shafts are detachable couplings in the various shafts. $y$ is a water, as from fog, rain or snow separator, of any desired type and takes out entrained water, such as from fog, rain, snow, etc., as for example, from air sucked in through inlets $j$ of chamber $h_3$, where said chamber $h_3$ acts as a preliminary separator, the water separated therein being vented through means 16, and the air being sucked through conduit 10, close to hot motor $k_1$, to melt any snow or ice crystals, and then flows to separator $y$ and then via conduit 11 to compressor $o_1$, $y$ having water venting means there shown, and herein described, as a valve connection, and water venting means 16 are also shown in all the other chambers, also acting as separators of Fig. 1. $z$ is a heat exchanger of any desired type. In Fig. 1, no attempt has been made to show relative sizes or proportions of any part or to show any steering, elevating or stabilizing fins or planes, all or any of which may be used therewith—as will be clear to those skilled in the art without more detailed description.

The aircraft shown in Fig. 1 may be actuated either with or without gas bag $a$, airplane $b$ or propeller $p$ and either with or without one or more of the flying chambers ($h_1$ to $h_6$ inclusive) in operation and any desired additional number of flying chambers may also be used and one or a plurality of motor blowers, air compressors or any other part thereof may be used.

With air bag $a$ or airplane $b$ and propeller $p$ the aircraft may operate like any gas bag or airplane aircraft. Without gas bag $a$ or airplane $b$ or both the aircraft may operate either with or without propeller $p$ or the aircraft may operate with any combination of the above mentioned parts.

In the preferred form of my invention motor $k_1$ or $k_2$ or both actuate air-blower $o_1$ via shafts $n$ and the detachable couplings to cause it to draw in air from the surrounding atmosphere thru openings $j$ into flying chamber $h_1$ or $h_2$ or $h_3$ or all and via openings 8, 9, 10 and connecting pipes and pipe 11 into blower $o_1$ and from it via pipe 12 and connecting pipes to flying chamber $h_4$ or $h_5$ or $h_6$ or all via openings 13, 14, 15, and thence via openings $j$ into the surrounding atmosphere.

Any or all flying chambers, $h_1$ to $h_6$ inclusive, may have drains 16 adapted to separate rain or moisture from the air being handled by blower $o_1$. The little circles shown in the various pipes, represent valves. If so desired, blower $o_2$ actuated by shaft $n$ may be used either with or without blower $o_1$ in operation. When blower $o_2$ is used, either as shown, or as may be done between any other adjacent inlet and outlet chambers, then the conducting air conduits to and from it may be omitted. Blowers $o_1$ and $o_2$ may be varied in speed or reversed in operation so that the before mentioned inlet chambers may become outlet chambers and vice versa, or a cross connecting system of pipes and valves, such for example as shown may be used, so that blower $o_1$ may not need to be reversed in order to reverse the flow of fluid to or from any flying chamber and one or more of the various valves, as shown, may be used to regulate the quantity of flow to or from any flying chamber and any additional number of flying chambers may be used as from connections 17 and 18. Some of the many other arrangements of flying chambers are shown and described in connection with the other figures. Structure $c$ and carriage $d$ may be of any desired shape or have any desired stream lines and structure $c$ may be adapted to act as an airplane or may be assisted by airplane $b$. When $c$ acts as a lifting airplane surface, it preferably has some inlet openings on its under surface, to chamber $h_4$, adapted to compress inlet air, as was described re inlets to chambers $h_2$ and $h_3$. Many and varied ways, some of which are shown in the other figures, may be used in so placing inlets and outlets from and to the surrounding atmosphere, to and from the flying chambers, so as to most economically use fluid jets and so as to most economically engage the surrounding atmosphere and so as to lessen or obviate undesirable force of the fluid jets on or by any of the various parts of the aircraft.

If the aircraft is on the ground or on the water, then the following is one of the many ways of raising it up into the atmosphere and moving it therethrough and causing it to descend to another location on ground or water. With necessary shaft couplings connected and necessary valves open or shut, either or both motors $k_1$, $k_2$ actuate blower $o_1$ and cause air from the atmosphere to be drawn in thru an opening $j$ to an inlet chamber or chambers, as for example into chamber $h_1$ as later on described in Fig. 4, and via outlet 8 and connecting pipes and via separator $y$ and pipe 11 to blower $o_1$, from which it will be discharged via pipe 12 and via heat exchanger $z$ and connecting pipes and inlet 13 to chamber $h_4$ and via its opening or openings $j$, to the surrounding atmosphere. This causes the aircraft to rise from the ground or water, steering planes, not shown, may be used, or air may be drawn into or expelled from, or both, through one or more steering chambers (see other figures) to point the aircraft in any desired direction or to hold it against wind currents. When a desired altitude has been reached then inlet chambers $h_2$, $h_3$ or both and outlet chambers $h_5$, $h_6$ or both may be put into operation by opening and regulating necessary valves to cause the aircraft to travel through the atmosphere to any desired point on the earth. When chamber $h_2$ or $h_3$, or both, or their equivalent, move into the atmosphere, it causes compression of the air to its openings $j$, and so assists blower $o_1$, both as to capacity and economy. When it is desired to descend through the atmosphere to that desired point on the earth, then the action of one or more or all of chambers ($h_1$ to $h_6$ inclusive) are retarded or reversed and the steering planes or steering flying chambers are put into desired operation until the aircraft has alighted. In no wind and with proper regulation the aircraft may rise from or descend to the earth, nearly vertically, with any desired speed and in a wind the proper regulation of the propelling and steering means may cause it to do likewise.

From this it is evident that when the force of the properly pointed outlet jets on the atmosphere exceeds the attraction of gravitation that the aircraft must rise and when contrary that the aircraft must descend to or remain on the earth and when the force of the properly pointed jets on the atmosphere exceed the force of wind currents and air-resistance that it must move against or across said wind currents and when contrary, then with or across said wind currents. It is obvious that if chambers $h_2$, $h_3$ or both are inlet chambers and if the aircraft's movement is from left to right, then the force of the atmosphere against said chambers will cause initial economical compression of the air to the blower. Obviously propeller $p$ may be used to augment or assist or modify or retard the above described operation as may also airplane $b$. In general I prefer that the air inlets to flying chambers shall be so placed as to balance their force on the surrounding atmosphere. Said force can otherwise be used to advantage in any direction of movement of the aircraft and in general I prefer to have all jets so placed as to prevent any tilting or undesirable position of said aircraft.

To provide for a flow of fluid from the outlets of the flying chambers to assist the air blower or to get along without it if it were out of order or if the fuel to operate the motors were exhausted or if the motor or motors were out of order or for primary or auxiliary use in rising from the earth or returning thereto or for use to maintain flotation in case of a sudden stoppage of motor or blower, I provide for the storage of a fluid for such purposes. This fluid may be of any desired nature if placed in container $u$ before flight or may be put into said container either before or during or after a flight, by utilization of available substances, such for example as air from the atmosphere or from the exhaust gases from the motor.

In its simplest form but in its least storable quantity I use either compressed air or compressed exhaust gases in container $u$, as by the compressing action of compressor $r$ actuated by one or more of the motors $k_1$ to $k_4$ inclusive or by means $w_1$ or from any other desired source of power where air from the atmosphere or exhaust vapors from a motor is drawn into compressor $r$ through pipe 1 and past necessary valves, opened or shut and regulated as may be desired, and is discharged from compressor $r$ through pipe 2, where $s$ is here a continuation of pipe 2, and through inlet 3 into container $u$. Compressed gas from container $u$ may flow from it via outlet 5 and valved pipe 33 to the system of pipes leading to flying chambers $h_4$, $h_5$, $h_6$. But in order to store a greater reserve of power fluid for use in the flying chambers and to lessen the weight of container $u$, because of less strength thus required, I resort to liquefaction of the compressed air or gas from compressor $r$ by use of any desired type of liquefier, as $s$, connected to compressor $r$ and container $u$ by necessary pipes, for example as here shown. Here liquefier $s$ may be of the ordinary condenser type, either air or water cooled or may be of the regenerative type or a combination thereof or any other desired type, and may use valved pipe 24. As the liquefied air or other gas will usually have a lower temperature than surrounding atmosphere, with a container pressure equal to or a little greater than the atmospheric pressure, I provide insulation $t$ and valved vent pipes 25, 26, where one of the valves may be a safety valve set to release the container pressure if it tends to get above a predetermined amount.

Liquid pump $v$ requires but little power and may be actuated by motors $k_1$ or $k_2$ or by power from a living being, by crank $w_2$ or by any other desired power from any other available sources, such as by a wind motor like $k_3$ or a water motor like $k_4$, properly attached thereto, similarly as was done at compressor $r$, as will be clear to those skilled in the art without more detailed drawing or description. Liquefied air or liquefied gas is pumped by pump $v$ via outlet 6 and via valved pipe 27 and pipes 28, 21, 22, 23 and is exposed to any desired source of heat, in its flow thru said pipe, as to that of the surrounding atmosphere or as to that in part 22 in chamber $h_4$, so as to vaporize it, so that it flows as vapor or gas from pipe 23 into the left hand valve system of piping, as shown, to supply fluid jets via their connecting conduits via the flying chambers. The energy of the fluid from tank $u$ of Fig. 1 or tank $du$ of Fig. 15, is used for many purposes, some of which are:—to assist ascent from the earth, to be used in case of stoppage of motor, to be used in descent to the earth, in all cases however, I desire that a reserve of this fluid shall be on hand when about to leave the earth and at all times when not on the earth and when flying, that part of the energy of the motor shall be devoted to maintaining this reserve. Air to or from blower $o_1$ or both may be heated to increase its jet power or to melt frost or ice in any part of the system by heat from the exhaust of a motor through valve connections provided therefor, as shown or by any other desired heating means, for example as by heat from motor $k_1$ to conduit leading from chamber $h_3$ via inlet 10 to separator $y$ or as by exchanger $z$ and its various valved connections or said hot exhaust from a motor may mix with the compressed air from blower $o_1$ through the valved pipes as shown and exhaust from the motors may be vented in all or in part in any other desired manner for any other desired use as via valved connections 30 to 32 inclusive, as for example into flying chamber $h_6$ or into the atmosphere or into the suction of compressor $r$. If it is desired to have pulsating air jets then automatic means, having any desired means therefor, such as parts 46, 47, 48, may be used, where pulsations may be produced by the action of ordinary or relief valves 46, 47 or by action of shaft end in part 48, or parts 46, 47 or both or all.

In Fig. 2 $h$ is a flying chamber having orifices $j_1$, $j_2$, $j_3$ and nozzles $j_4$, $j_5$, $j_6$, $j_7$, adapted for the flow of a fluid therethrough either to or from said chamber. These orifices may be of any desired contour, as for example, simple orifice $j_1$ or may have varied sections, as $j_2$, $j_3$. The nozzles may project into or out of the chamber and may have any desired contour, such for example, as plain nozzles $j_4$, $j_5$ or nozzles of varied cross section as $j_6$, $j_7$. Any orifice or nozzle is preferably so designed and located as to economically handle the flow of fluid therethrough either to or from said chamber, from or to atmosphere surrounding said chamber.

In Fig. 3 $h$ is a flying chamber, that may have one or more orifices or nozzles where 34 is a point about which the chamber may be revolved so that nozzle $j$ may have its position varied to any other desired position, such for example, as positions $j_1$ to $j_7$, inclusive, so that fluid flowing therethrough may have its direction of action on the surrounding atmosphere changed by revolving nozzle $j$ to any other desired position.

In Fig. 4 structure $c$ has two flying chambers $h_1$, $h_2$ having openings $j_1$, $j_2$, all so designed that the action of a fluid flowing through said openings from or to the surrounding atmosphere may tend to approximately balance the forces of jets $j_1$ and $j_2$ on said chamber relative to the surrounding atmosphere, with structure $c$ moving in the direction 35, 36. If said structure $c$ moves in direction 37, 38 then jets through openings $j_3$, $j_4$ from chambers $h_3$, $h_4$ would also tend to balance each other's force between said structure and the surrounding atmosphere. These opposed jets, particularly when air inlets, may be the only inlet jets used or may be supplemented by other inlet jets acting elsewhere, as may be desired and may be used in some cases and not used in other cases, as may be desired.

In Fig. 5 flying chamber $h$ has any desired number of orifices or nozzles or both such as $j_1$, $j_2$. 39, 40 are fluid deflecting or directing surfaces of any desired kind or shape, either fixed or movable, here shown as pivoted at 41, 42 and having pivoted connections 43, 44 connected to arm 45 so that by the adjustment of the position of arm 45 said deflecting surfaces may be in the full line, vertical positions or in any other desired position, such for example, as in either of the slanting dotted line positions shown, all so designed and installed as to cause a fluid flowing through said openings $j_1$, $j_2$ to or from said chamber $h$ from or to the surroundng atmosphere, to exert a force in varied directions between said flying chamber and the surrounding atmosphere. Surfaces similar to 39, 40 may also be used as rain deflectors for inlet orifices of a flying chamber, where they may be either fixed or movable or may be inside or outside of said chamber.

In Fig. 6, $j$, $j$, $j$, are a plurality of circular orifices or nozzles in a wall of a flying chamber $h$.

In Fig. 7, $j_1$, $j_2$, are a plurality of square or rectangular orifices or nozzles in a wall of a flying chamber $h$, which may have stays 49, 50, 51, 52, between opposed walls of said chamber and where a plurality of said chambers may be formed by divisions 53 to 62 inclusive, between the opposed walls of said chamber all so designed and adapted that any one or more of said chambers may be out of operation while any one or more of the other chambers may be in operation. For example, here 49—52, 55, 50—51 and 60 show the walls of one chamber having a plurality of closely grouped square openings and 53—54, 56—57, 58—59 and 61—62 show parts of two walls of other chambers and 54, 55, 56, 57, 50—51, 58, 59, 60, 61 and 62, 52—49, 53 show one wall and parts of two walls of other chambers.

In Fig. 8, $j$, $j$, $j$, are a plurality of hexagonal orifices or nozzles in a wall of a flying chamber $h$. Not all the squares or rectangles of Fig. 7 nor all the hexagons of Fig. 8 need the openings, for some of them may be blank and some of them may be inlets and some of them may be outlets. In general I prefer to regulate the area and positions of all such openings so that their relative area and their force on the atmosphere is economical and operative for the purpose required from them. All of which will depend more or less on the force of flow through an opening and the resistance and inertia of the atmosphere acted on and the speed and direction of movement of the aircraft. I prefer not to disturb the surrounding atmosphere on which the jets act any more than is operatively and economically necessary to achieve the requirements of said aircraft. To best accomplish this and to best utilize a given air chamber surface, I prefer to have a maximum portion of that surface open to the atmosphere, through its properly throttled openings, where the hexagonal openings of Fig. 8 and the square or rectangular openings of Fig. 7, give maximum open areas and the staggered circles of Fig. 6 give much more open area than if said circles were not thus staggered. These are some of the many forms of openings which may be termed "closely grouped" openings, orifices, or jets, etc. Again referring to Fig. 2, fitted with any desired type of orifices or nozzles, I desire to maintain a fairly uniform pressure in air chamber $h$ and to let the air out of or into $h$ so as to have a maximum force on the atmosphere for a given chamber surface and yet not have the pressure too high nor too low in $h$, nor cause too great a disturbance of the surrounding atmosphere, by the air jets.

In Fig. 9 flying chambers $h_1$, $h_2$ support carriage $d$. Said flying chambers may have extensions which are either fixed or adjustably fixed so that said chambers may be in any desired position, either as shown or by being revolved about a point 34, so as to cause fluid flowing from said chambers to the surrounding atmosphere to so flow as not to have undesired effect on carriage $d$ or so as to tend to cause atmosphere tending to displace that pushed away by the jets to be replaced by atmosphere having a desired lifting or other desired effect on the aircraft. Upper full line arrows show the direction of flow of fluid from said chambers to the atmosphere and upper dotted arrows and lower full line arrows show atmospheric effect on the aircraft.

In Fig. 10, flying chambers $h_1$, $h_2$ support carriage $d$ and have their fluid orifices so disposed as to lessen their undesired effect on carriage $d$, by being set apart so as not to be over said carriage.

In Fig. 11, flying chambers $h_1$, $h_2$, support carriage $d$ and have their fluid orifices either inclined or have jet deflecting surfaces or both so as to lessen undesired effect of said jets on said carriage or for any other desired purpose, such as for example as heretofore set forth or as may be desired.

In Fig 12, structure $c$ may be moved through the atmosphere in any desired direction, as for example, in direction 35, 36 or 37, 38, or up or down, or any combination thereof and may have any of its surfaces inclined to its line of motion through the atmosphere and may be provided with one or more additional flying chambers. Flying chambers $h_1$ to $h_8$ inclusive, have openings $j_1$, to $j_8$ inclusive. One or more of upper or lower chambers $h_5$ to $h_8$ (upper chambers $h_5$, $h_6$, $h_7$, $h_8$ are located over similar chambers on the under side of $c$) inclusive may exert a force normal to structure $c$, on the atmosphere and one or more of chambers $h_1$ to $h_4$ may exert a twisting force between structure $c$ and the atmosphere, so that a regulation of the jets of one or more of said chambers may cause structure $c$ to be steered either up or down or in any other desired direction or may be so regulated as to keep said structure in any desired position in the atmosphere.

In Fig. 13, flying chamber $h$ moving in the direction 35, 36 has a plurality of orifices $j_1$, $j_2$. Here it is evident that the jets from said orifices near $j_1$ will cause the atmosphere to have been disturbed before jets nearer $j_2$ pass over it. To diminish such an action I install flying chambers and their orifices so as to contact with larger masses of undisturbed atmosphere, in any desired manner, as for example, by the arrangement shown in Fig. 14, where $h_1$, $h_2$, $h_3$, are flying chambers having orifices or nozzles and have movement in the direction 35, 36 so that a larger and less disturbed mass of the surrounding atmosphere is brought into contact with their said jets and so more desirable action of the aircraft in the atmosphere results therefrom. In general I prefer that the air chambers shall have no outwardly projecting projections from their outer surfaces, such for example as nozzles, or other parts, which would tend to offer increased frictional resistance to movement through the atmosphere and where I use nozzles or constricted orifices in an air chamber wall, I prefer that such nozzles or orifice constrictions shall be inside of the outer opening in an air chamber surface, which contacts with the atmosphere, through which it is to move, so as to offer minimum resistance to its movement therethrough, whether it acts merely as a jet surface or as a combined jet and velocity lifting surface, or sometimes as a jet surface and sometimes as a non-jet lifting surface.

In Fig. 15, $chj$ is a structure having one or more flying chambers and one or more orifices to cause a force to be exerted by jets flowing therefrom on the surrounding atmosphere. $du$ is a carriage supported by said structure adapted to support a passenger and a fluid storage tank adapted to be filled with a jet producing fluid. $w$ is means, as for example, pedals like those of a bicycle for causing means to force a fluid into said storage tank or into said flying chambers or both, adapted to be actuated by said passenger, as for example by his feet. Any desired means automatically or manually controlled by said passenger are provided to determine this aircraft's relative location or speed or all in the atmosphere relative to a fixed point on the earth's surface. And this aircraft may be actuated either by a fluid first stored in the fluid tank or by power forcing it thereinto, from the passenger, or both. When one or more human beings, through their own physical force, actuate means $w_1$, of Fig. 1, or means $w$, of Fig. 15, then, their physical force is the result of food they have eaten, or bodily tissues they have thus consumed, or both. For example, an aircraft with several people on board, may be stranded because of lack of fuel, where fuel cannot be replenished. Then these people may, by actuating $w$ or $w_1$, thus act, and then be able to go a short distance and then repeat and repeat until they reach some regular source of fuel supply. So, over a long period of time they may store up energy to operate the aircraft for a short period of time and that food or consumed bodily tissue is really the emergency fuel for the aircraft's operation. This may save the lives of these people and preserve the otherwise lost aircraft and its cargo of merchandise.

A somewhat similar action, is that of a little power, exerted over a long period of time, to actuate an air pump, and then quickly expending the considerable accumulated power, in a short period of time, to set the air brakes on a train.

All or any of the modifications of Figs. 2 to 15 inclusive are to be considered as having been incorporated in Fig. 1 but have been thus shown in separate figures in order to avoid further resultant crowding and complication of Fig. 1.

Believing that my invention is extremely novel and far reaching I wish to claim it and any of its modifications and adaptations, either as processes or apparatus or both, in the broadest possible manner.

What I claim is:—

1. In an aircraft member, the combination of a chamber adapted to contain air, a plurality of closely grouped hexagonal openings in a wall thereof, opening therefrom to the atmosphere, an opening through a wall thereof adapted for connection of an air conduit thereto.

2. In an aircraft member, the combination of a chamber adapted to contain air, a plurality of closely grouped hexagonal nozzles in a wall thereof, opening therefrom to the atmosphere, an opening through a wall thereof adapted for connection of an air conduit thereto.

3. In an aircraft the combination of a pair of wings, each composed of an air chamber and having a plurality of closely grouped openings therefrom to the atmosphere, the wings being adjustably hinged so as to vary the direction of flow force therefrom on the atmosphere.

4. In an aircraft, the combination of a motor adapted to actuate an air compressor with an air compressor, air inlet means leading to the compressor, air outlet means leading from the compressor to air liquefying means, air liquefying means, liquid air outlet means leading therefrom to a liquid air receiver, means adapted to convey liquid air from the receiver to a liquid air evaporator, a liquid air evaporator, compressed air outlet means leading therefrom to a compressed air chamber, a plurality of closely grouped flow openings leading therefrom to the atmosphere.

5. In an aircraft, the combination of a motor adapted to be actuated by man power, adapted to actuate an air compressor, with an air compressor and a liquid air receiver and a liquid air vaporizing means, an air inlet means leading to the compressor, air outlet means leading from the compressor and from the vaporizer to an air chamber, a plurality of closely grouped flow openings therefrom to the atmosphere.

6. In an aircraft, the combination with a motor and an air compressor adapted to be actuated thereby, of a heat exchanger adapted to cause hot exhaust from the motor to heat compressed air from the compressor, a conduit for conducting the heated compressed air to an air chamber having a plurality of closely grouped flow openings therefrom to the atmosphere, the exterior of the air chamber being in contact with the atmosphere and adapted to be heated by the hot air therein to prevent ice formation thereon.

7. In an aircraft, the combination of a fuelless motor with an air compressor and with air liquefying means and with means to vaporize liquid air therefrom, means to cause the vaporized liquid air to cause air jets for reaction thereof on the atmosphere.

8. In an aircraft, the combination of a plurality of compressed air chambers, each having more substantially horizontal length and width than substantially vertical depth and each having a plurality of openings adapted for air flow therethru in its lower substantially horizontal surface, to the atmosphere, the air chambers being spaced apart and substantially parallel one with the other and being so positioned that the substantially vertical projection of one chamber does not fall substantially on another chamber, so that when moving through the atmosphere, the flow of air from one chamber impinges on less disturbed atmosphere than if the plurality of chambers were combined into one chamber, having the substantially vertical projection area of said plurality of chambers.

9. The combination of an aircraft chamber adapted to contain air for jet reaction purposes, with a plurality of groups of air jets, each group adapted to have its air jets act in a different direction from that of another group, means to independently control any one of said groups, so that proper control thereof will change the tilt of said chamber in any desired direction.

10. In an aircraft member, the combination of a chamber adapted to contain air, a plurality of openings in a wall thereof, opening therefrom to the atmosphere, said openings being grouped substantially as closely as their cross-sectional contours will permit and having their centers substantially located on the corners of a hexagon, an opening through a wall thereof adapted for connection of an air conduit thereto.

11. In an aircraft member, the combination of a chamber adapted to contain air, a plurality of nozzles in a wall thereof, opening to the atmosphere, said nozzles being grouped substantially as closely as their cross-sectional contours will permit and having their centers substantially located on the corners of a hexagon, an opening through a wall thereof adapted for connection of an air conduit thereto.

12. In an aircraft member, the combination of a lifting chamber adapted to contain air, a plurality of openings in a lower wall thereof downwardly opening therefrom to the atmosphere, said openings being grouped substantially as closely as their cross-sectional contours will permit, means to introduce compressed air into the chamber.

13. In an aircraft member, the combination of a lifting chamber adapted to contain air, a plurality of nozzles in a lower wall thereof opening downwardly therefrom to the atmosphere, said nozzles being grouped substantially as closely as their cross-sectional contours will permit, means to introduce compressed air into the chamber.

14. An aircraft having in combination, fixed opposed groups of air inlet means, an air compressor, air outlet means, means whereby one of said groups may be converted into air outlet means, means leading from the air inlets to the air compressor and from the compressor to the air outlet means, the air inlet means being adapted to draw in atmosphere in a substantially horizontal direction, the disposition of the opposed groups of air inlet means being such as to substantially neutralize horizontal force between them and the atmosphere, to substantially prevent undesired movement of the aircraft in a substantially horizontal direction, when rising from or descending to a desired take-off or landing place.

15. In an aircraft, a unitary boxlike member adapted to hold motive jet air, means dividing said member into a plurality of chambers each adapted to hold motive jet air and each provided with a plurality of closely grouped openings to the atmosphere through one of its sides, a controlled air conduit for each of said chambers, all so adapted that injury to a chamber will not prevent continued functioning of the uninjured chambers.

16. A boxlike aircraft member adapted to contain air for motive jet purposes, a wall of said member having a plurality of openings to the atmosphere, grouped substantially as closely as their cross-sectional contours will permit and means to prevent distortion or rupture of its opposed sides because of a difference in pressure between the air therein and the surrounding atmosphere, by means of a plurality of spaced apart members therein, fixed to and extending substantially perpendicularly between its substantially parallel opposed sides and adapted to transmit force from one to the other thereof to balance its otherwise distortional or rupturing effect on said opposed sides.

17. In an aircraft adapted to be actuated by a plurality of closely grouped air jets therefrom, means for taking in atmospheric air for said jets, heating means to melt entrained snow or ice taken in with said air, and means for removing the resultant water from said air.

GARDNER TUFTS VOORHEES.